(12) United States Patent
Clark et al.

(10) Patent No.: US 6,643,390 B1
(45) Date of Patent: Nov. 4, 2003

(54) COMPACT FINGERPRINT IDENTIFICATION DEVICE

(75) Inventors: Peter P. Clark, Boxborough, MA (US); Douglas S. Goodman, Sudbury, MA (US); William T. Plummer, Concord, MA (US)

(73) Assignee: Polaroid Corporation, Waltham, MA (US)

( * ) Notice: Subject to any disclaimer, the term of this patent is extended or adjusted under 35 U.S.C. 154(b) by 0 days.

(21) Appl. No.: 09/553,468

(22) Filed: Apr. 19, 2000

(51) Int. Cl.[7] ................................................ G06K 9/00
(52) U.S. Cl. ......................................... 382/124; 356/71
(58) Field of Search .............................. 382/115, 116, 382/124–127; 235/379, 380; 356/71, 451; 73/185, 186; 340/5.53, 5.83; 359/710, 663

(56) References Cited

U.S. PATENT DOCUMENTS

| | | | |
|---|---|---|---|
| 3,174,414 A | 3/1965 | Myer | 95/1.1 |
| 3,527,535 A | 9/1970 | Monroe | 356/71 |
| 5,177,353 A | 1/1993 | Schiller | 250/227.11 |
| 5,416,573 A | 5/1995 | Sartor, Jr. | 356/71 |
| 5,623,553 A | 4/1997 | Sekiya | 382/127 |
| 5,900,993 A | * 5/1999 | Betensky | 359/710 |
| 6,127,674 A | * 10/2000 | Shinzaki et al. | 250/227.28 |

FOREIGN PATENT DOCUMENTS

JP 63228271 9/1988

OTHER PUBLICATIONS

Polaroid PFS–100 Specification Sheet, Publicly Distributed on May 11, 2000.
Peter P. Clark et al., "Compact Finger Imager", published in SPIE Proceedings, vol. 3779, presented Aug. 1999.

* cited by examiner

Primary Examiner—Samir Ahmed
Assistant Examiner—Vikkram Bali (57) ABSTRACT

A compact, low-cost finger imager, to be used for enrolling and recognizing individuals based upon their finger ridge patterns. The optical system employs viewing beyond the critical angle and darkfield illumination for maximum image contrast. The optical system is afocal and telecentric, achieving corrected distortion with oblique viewing.

4 Claims, 6 Drawing Sheets

AT FINGER  50 X 50 um

DETECTOR ELEMENT  12 X 6 um

MAGNIFICATIONS: 12/50 & 6/50

COMPACT FINGERPRINT IDENTIFICATION DEVICE

FIELD OF THE INVENTION

This invention relates to fingerprint identification devices and, more particularly, to a compact fingerprint identification device which produces a light image of fingerprint ridge patterns upon a dark-field background.

BACKGROUND OF THE INVENTION

The field of biometrics involves identifying people by measuring parts of their bodies. Many automated techniques are currently in use or under development, including fingerprint, palm print, finger pores, hand geometry, iris, retina, and face recognition. Fingerprint identification is one of the oldest and best-established methods of objective identification, originally being used in law enforcement. It now promises to find wide acceptance as a convenient and secure alternative to typed passwords, mechanical keys, or written signatures for access to computers, facilities or vehicles, and identification for financial transactions.

There are a number of different identification tasks, from determining the identity of an unknown person based on a fragment of the pattern of an unknown finger, to verifying the identity of a known person to a level of certainty, based on the pattern of a specific finger. The pattern acquisition system requirements vary accordingly, with high resolution, field of view and contrast allowing more certain identification. The FBI has published a set of standards for law enforcement fingerprint recording, the Automatic Fingerprint Identification System (AFIS) standard. The AFIS standard provides a guideline for the design of a high-quality fingerprint acquisition system.

Human fingertips have distinctive patterns of curved ridges, with a period of about 0.5 mm, depth of about 0.1 mm. Finger tissue scatters red light with a diffuse reflectivity of about 50%, and the refractive index of a finger as measured with an Abbe refractometer is about 1.51. It is desirable to have as large a field of view as possible with minimum distortion to provide more features for identification and more margin of error in finger placement.

Ridge patterns are recorded, and software extracts the coordinates and classes of features like ridge ends and bifurcations (called "minutiae"). There is also a line of tiny pores on the ridges that is more difficult to resolve, but can be used to provide more information. For a finger in air, ridges may be seen by the specular reflection of light from a localized source, but image contrast is limited by the underlying scattering, and tipping of the finger so it is not perfectly flat on the imaging surface. The rounded shape of the finger can cause unacceptable distortion of the image. With contact methods, the user flattens the fingertip against a surface; then ridges and valleys can be distinguished by height. There are electronic sensors that measure capacitance variation, and optical sensors that view the finger pressed against a transparent platen or window. Optical contact sensors record changes of specular reflectance, imaged onto a sensor such as a CCD or CMOS detector array.

Most fingerprint identification devices are bright-field devices, that is, they produce a dark fingerprint ridge patterns on a light background. To produce a fingerprint image with acceptable contrast, additional optical components are required to generate an uniformly bright background. Because of additional components, it is difficult to make a compact bright-field device.

U.S. Pat. No. 5,900,993 issued May 4, 1999 and entitled "Lens Systems for Use In Fingerprint Detection" describes a lens system having a first and second lens in combination with a third cylindrical lens to reduce optical distortion and further describes the problems associated with using holographic optical elements, off-axis optics, and tilting the object plane.

An approach using cylindrical lenses requires additional components and inherently complicates the alignment of the lens system because a lack of symmetry causes the alignment process to handle an extra degree of freedom in lens placement.

What is needed is a compact fingerprint identification device having high quality images with minimum distortion which can be adapted for use in a small volume such as an in a keyboard or an electrical key or switch, and which contains a minimum number of components and to facilitate production.

SUMMARY OF THE INVENTION

The present invention is advantageously adapted to provide a compact, low cost fingerprint imaging apparatus with minimal image distortion. The apparatus has a platen with a finger receiving surface, mounted in a housing and includes a light source mounted in the housing providing radiation which is scattered from a finger receiving surface along an optical axis. An image sensor, with rectangular pixels or square pixels combined to form a rectangle, is used to receive the fingerprint image. The optical system has a first lens disposed between said finger receiving surface of the platen and the image sensor along the optical axis, a second lens disposed between the first lens and the image sensor along the optical axis such that the first lens and second lens form an afocal optical system which images a square area on the tilted platen finger receiving surface onto the rectangular pixels of the image sensor to minimize anamorphic, non symmetric distortion. An aperture stop is placed between the first lens and the second lens to block radiation from the light source so the blocked radiation does not contribute to the image focused on the plurality of rectangular pixels.

It is therefore an object of the present invention to provide a fingerprint imaging apparatus with a minimum number of components having a minimum volume with minimum depth and width such that the apparatus is compact enough to fit within a computer keyboard, mouse-like devices and point of sale terminals.

It is another object of the present invention to provide a mechanical design with plastic components which facilitates manufacturing a low cost device.

It is a further object of the present invention to provide a fingerprint imaging apparatus with an image sensor with rectangular pixels product that will allow convenient acquisition of finger ridge images electronically; interfacing with software that allows enrollment and identification.

Other objects of the invention will, in part, appear hereinafter and will, in part, be apparent when the following detailed description is read in connection with the drawings.

BRIEF DESCRIPTION OF THE DRAWINGS

These and other features of the invention are more fully set forth in the detailed description and drawing of which.

DETAILED DESCRIPTION OF THE INVENTION

Figure 1:
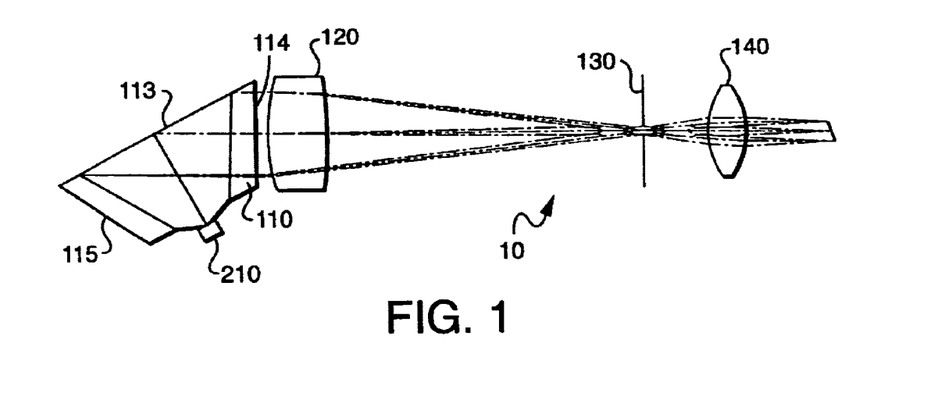
FIG. 1 is an oblique meridian view of the optical components of a fingerprint imaging apparatus according to the present invention.

There is shown in FIG. 1 a fingerprint imaging apparatus 10 according to the present invention. The fingerprint imaging apparatus 10 includes a platen 110 which provides a finger receiving surface 113, a light source 210, a first lens 120, a second lens 140, and an aperture stop 130. In order to provide increased durability and reliability, the platen 110 is a glass prism in a preferred embodiment because of its hardness and relatively high refractive index. The fingerprint imaging apparatus 10 illuminates objects on the finger receiving surface 113 by the principle of contacting total internal reflection (TIR) as is known in the art.

Using a contact method, the finger can be viewed or illuminated obliquely, to increase contrast by TIR. Bright-field or dark-field illumination may be chosen. With bright-field illumination, light is directed into the aperture stop. If there is no contact, light totally reflects from the platen surface. When a finger is in contact, TIR does not occur, and most of the light is scattered out of the imaging path, so finger ridges appear dark.

In dark-field illumination, the detector receives scattered light from the contact regions of the finger beyond the critical angle. Where there is no contact, the finger is not visible to the sensor. Finger ridges appear light. In a preferred embodiment, dark-field illumination is used, because it simplifies the requirements of illumination control. Very simple flood illumination can be used to reduce size, cost and assembly complexity.

In a preferred embodiment the light source 210 comprises a pair of light emitting diodes (LEDs) with a central wavelength of 660 nm. The LEDs are located behind the platen 110, opposite the finger receiving surface 113. The LED output falls off towards the edge of the field, but the image contrast is sufficient to provide a signal indicating the presence or absence of a fingerprint ridge. The LED power levels are set for each unit at assembly, compensating for variations, including LED output variation. Illumination nonuniformity may be corrected by software which is used to process the image generated by the image sensor 220.

The first lens 120 can be preferably made with a red dye, designed to pass the light source 210 illumination at 660 nm and block other wavelengths, reducing stray light from outside the device. The first lens 120 and the second lens 140 in the fingerprint imaging apparatus 10 do not have to be simple lenses. As one of ordinary skill in the art can appreciate, several of the surfaces of the fingerprint imaging apparatus 10 may be made aspheric for purposes of aberration control.

In a preferred embodiment, only the finger receiving surface 113 and an output face 114 of the platen 110 need to be polished. Additionally the output face 114 should be optically flat. The illumination from the light source 210 enters via a ground surface 117 of the platen 110 which improves the visual appearance of the unit. The optical absorber 115 surface is opposite the output face 114 and is painted black. In an alternate embodiment, all faces of the platen 110 can be placed and angled to avoid direct and indirect reflections of unintended radiation. The image sensor 220 views the black optical absorber 115 if nothing is contacting the finger receiving surface 113.

The contacting TIR design of the present invention combined with an oblique finger viewing angle as shown in FIG. 1 maximizes contrast and keeps the components in a compact vertical profile.

Figure 2:
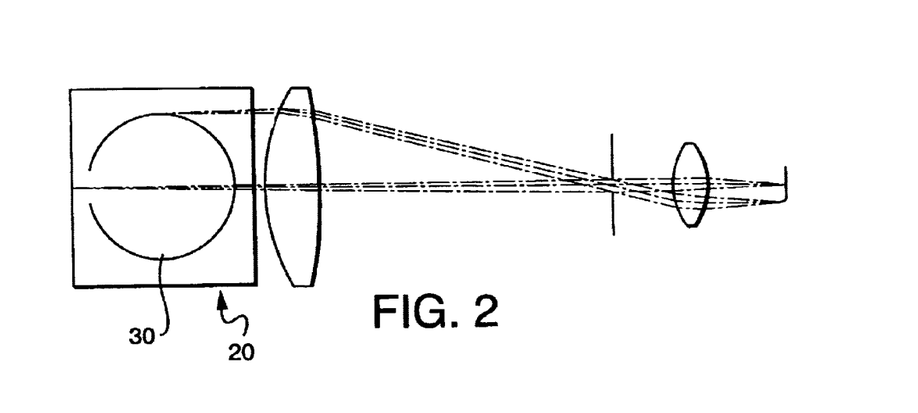
FIG. 2 is a transverse meridian view of the optical components of a fingerprint imaging apparatus according to the present invention.

FIG. 2 shows a transverse meridian view of the fingerprint imaging apparatus 10 according to the present invention which as a result of the optical components has a circular field of view with a 17.2 mm (0.6 inch) diameter.

Figure 3:
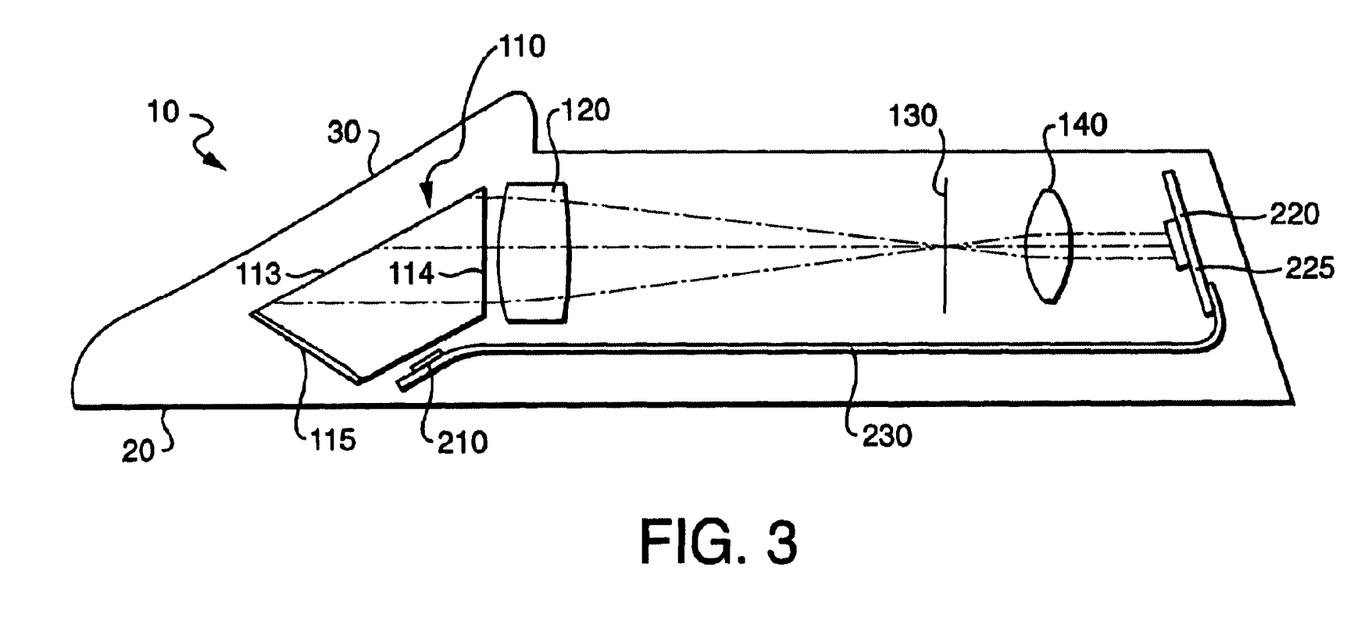
FIG. 3 is a schematic side elevation view of the fingerprint imaging apparatus according to the present invention.
Figure 6:
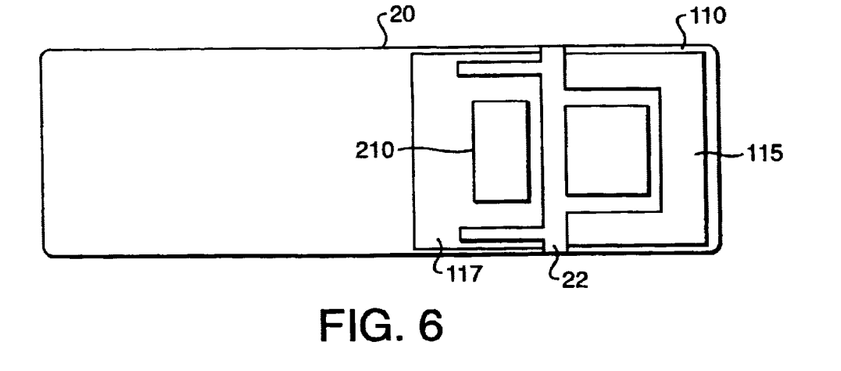
FIG. 6 is a schematic bottom view of a spring clip retaining the prisim according to a preferred embodiment of the present invention.

Now referring to FIG. 3, the optical components are shown mounted in a compact housing 20. In a preferred embodiment, the optics and housing 20 are constructed from precision molded plastic components in order to be assembled without adjustments. To reduce cost, it is desirable that the fingerprint imaging apparatus 10 be assembled without substantial post-assembly mechanical adjustments. Injection molding technology, which can be employed in a step and repeat manufacture of fingerprint imaging apparatus 10's optical and structural parts, is suitable for such assembly. However, assembly datums (not shown) must be carefully defined. There is one mechanical structure to which every component is referenced. The first lens 120, second lens 140 and aperture stop 130 have molded-in flanges and snap into the housing 20. As shown in FIG. 6, the glass platen 110 is located semi-kinematically in the housing and retained with a spring clip 22. The image sensor 220 is on a small circuit board (not shown), located by datum pads and bosses (not shown) in the structure. During the manufacturing process, image quality is evaluated and the sensor locating pads (not shown) are adjusted in the plastic housing mold to match the sensor plane to the best image plane.

Sensor rotation in its own plane is important, since the anamorphic imaging produces non-symmetric distortion if the sensor is not aligned. If the sensor is not aligned with the tilted surfaces, square areas on the finger surface are reproduced as parallelograms.

In a preferred embodiment, the image sensor 220 is a highly integrated CMOS sensor and associated electronics with rectangular pixels (dimension 12×6 microns) mounted on a printed circuit board 225. The light source 210 is preferably two LED's mounted on the flexible printed circuit 230. A dark-field background is provided in the viewing field of image sensor 220 by means of an optical absorber 115, such as black velvet or preferably black paint. Absorbtion can also be accomplished by gluing on black glass or plastic or by gluing the platen 110 against black plastic structural pieces.

To avoid keystone distortion (where an image appears larger at the top than the bottom), an afocal design is used according to the present invention as seen in FIG. 3. Afocal imaging systems can provide distortion-free imaging with oblique viewing, because afocal systems have constant magnification regardless of object distance. In the present invention the lens combination of the first lens 120 and a second lens 140 forms an afocal system.

A tilted plane is imaged to another tilted plane by an afocal system with rectangular anamorphism, whereas a non-afocal system images a tilted plane with keystone distortion, would be unacceptable. Telecentric viewing of the finger is also required to maintain constant viewing angle, relative to the finger receiving surface 113, across the field. Since the optics must be afocal, the system is also telecentric at the image sensor 220.

The need for a real aperture stop dictates a Keplerian telescope arrangement having two positive groups with an aperture stop 130 between the first lens 120 and the second lens 140. The aperture stop is located at the common focal plane of the telescope lenses, so all chief rays are parallel to the optical axis in both object (finger) space and image (sensor) space. This keeps the finger view angle constant across the field, so the dark field TIR viewing works well, and it also reduces distortion induced by focus errors. The aperture 130 is located at the common focal plane of lens 120 and lens 140. The aperture 130 is not round because the optical system is not rotationally symmetric. In a preferred embodiment, the aperture is a hole in black plastic shaped to get the best image quality. Without the aperture, the image quality would be reduced because of aberrated light and stray light.

The telescope (transverse direction) magnification, $m_{tr}$, is dictated by the large pixel width (12 $\mu$m) and the resolution needed at the finger (500 pixels/25.4 mm) so the $m_{tr}$ is −0.236. The AFIS standard requires finger (500 pixels/25.4 mm. The magnification in the oblique direction, $m_{ob}$ is lower, determined by a prism angle and index of refraction. The oblique magnification, $m_{ob}$ is required to be 0.118, one-half of $m_{tr}$, since the sensor pixels are 6 $\mu$m high.

The tilted plane afocal lens system images the finger surface onto the sensor anamorphically. If the finger surface is tilted from normal to the axis by $\theta$, the prism index is n, and the telescope magnification is $m_{tr}$, then the oblique magnification is $$m_{ob} = m_{tr}\sqrt{\frac{m_{tr}^2}{n^2}\sin^2\theta + \cos^2\theta}$$

Since $m_{tr}$ is determined by the pixel size and finger resolution, the combination of n and $\theta$ must
1) set $m_{ob}/m_{tr}$ to ½,
2) allow viewing from greater than the critical angle, and
3) yield a practical choice of platen material.

In a preferred embodiment, the platen 110 is made of F5 or similar glass (having a high refractive index n=1.60) with a critical angle is 61.1°. The prism angle is the same as the viewing angle: 61.1°.

The numerical aperture (NA) is elliptical measuring 0.049 (oblique)×0.084 (transverse) in image space. In the oblique direction, NA is determined by geometrical image quality. The telescope is shortened to balance image quality with diffraction and aberrations. Decreasing the preferred NA would lower the modulation transfer function (MTF) because of diffraction, and increasing it would lower MTF because of larger design aberrations, unless the telescope design was more complex.

Transversely, the sensor elements are larger, which allows the NA to be increased until the image quality is limited by assembly depth of focus tolerances.

The tilt of the final image plane from normal to the axis, $\theta'$, may also be calculated from:

$$\tan\theta' = \frac{m_{tr}}{n}\tan\theta$$

In a preferred embodiment, the image plane tilt is 15°.

In a preferred embodiment, the Keplerian telescope is implemented with two biaspheric lenses 120, 140 molded in poly-methlymethacrylate (PMMA). The telescope lenses are axisymmetric and the anamorphic imaging required is achieved with only object and image tilting. Pupi imagery is corrected as well as possible in the design, eliminating non-axisymmetric distortion because the chief rays are collimated in object and image space. This requires that spherical aberration of the stop must be corrected by each half of the telescope, using one of the aspheric surfaces of each lens. Symmetric distortion is corrected by "bending" one of the two lenses. Aspherizing both surfaces of each lens allows higher-order lens bending, which is a useful variable to improve image quality while maintaining object and image telecentricity. Design image quality is limited because the Petzval sum is not corrected. A negative element near the stop could improve performance, but the two-element design meets AFIS MTF requirements at numerical apertures low enough to allow adjustment-free assembly procedures.

To reduce the size of the fingerprint imaging apparatus 10, the object-to-image distance was minimized by two means:
1) Shortening the focal lengths of the telescope lenses as much as possible. This increases the chief ray angles in the stop space, making lenses more difficult to mold, and it increases the Petzval sum, limiting image quality.
2) Shortening the object distance on the finger side reduces overall length. If the object distance is shortened by d, the image distance increases by $m_{tr}^2$ d, so overall length decreases by $d(1-m_{tr}^2)$. In a preferred embodiment, $m_{tr}$=−0.236, so length is reduced by 0.94 d.

Construction data for a preferred embodiment of the present invention is given in TABLE 1. The following information helps to understand the construction data. First, in general, the construction data give the location of the object and image planes, the shape of the elements, their composition and hence their optical properties, and the distance separating them along the optical axis. By convention, one starts with the object and light proceeds through the optical system from left to right, as shown in the figures. A surface is given and this is followed by the thickness to the next surface along with the material of the medium located along that distance. The material is left blank for air. The next surface is then identified and its radius of curvature is specified. This is followed again by the thickness to the next surface and the intervening material. In this manner the optical path length, physical distance multiplied by index of refraction, is determined.

Axially symmetric aspherical surfaces are given by the following convention:

$$z = \frac{(CURV)Y^2}{1 + (1 - (1 + K)(CURV)^2 Y^2)^{1/2}} + (A)Y^4 + (B)Y^6 + (C)Y^8 + (D)Y^{10}$$

where CURV is the curvature at the pole of the surface (base curvature); K is the conic constant; and A, B, C, and D are the 4th, 6th, 8th, and 10th order deformation terms, respectively.

TABLE 1

(units, mm)

| ELEMENT NUMBER | RADIUS OF CURVATURE | | THICKNESS | GLASS |
|---|---|---|---|---|
| | FRONT | BACK | | |
| 1 (Platen) | INF | INF | 8.6000 | F5 Schott |
| | | | 0.1000 | |
| | | | 1.0000 | |
| 2 (L1) | A(1) | A(2) | 5.0000 | 'plxi' |
| | | | 25.8242 | |
| | | | 1.4026 | |
| | | | APERTURE STOP | C-1 |
| | | | 5.7179 | |
| 3 (L2) | A(3) | A(4) | 3.0000 | 'plxi' |
| | | | 7.3552 | |
| IMAGE | | INF | | |

APERTURE DATA

| APERTURE | SHAPE | DIAMETER | |
|---|---|---|---|
| | | X | Y |
| C-1 | ELLIPSE | 1.176 | 0.703 |

REFRACTIVE INDICES

| GLASS CODE | | |
|---|---|---|
| | | 660.00 |
| F5 SCHOTT | | 1.598533 |
| 'plxi' | | 1.489083 |

| ASPHERIC CURV | K | A | B | C | D |
|---|---|---|---|---|---|
| A(1) | 0.05150140 | −2.994911 | 3.84672E−05 | −1.11115E−07 | 2.19841E−10 | 2.05180E−13 |
| A(2) | −0.01883688 | 12.641388 | 2.25319E−05 | −3.99216E−08 | 4.13322E−10 | 0.00000E+00 |
| A(3) | 0.12545501 | −10.055538 | 1.56773E−03 | −7.98461E−06 | 0.00000E+00 | 0.00000E+00 |
| A(4) | −0.18891996 | 0.820047 | 1.92164E−03 | 1.03453E−04 | 3.23505E−06 | 1.26089E−07 |

SURFACE TILTS

| Surface | Tilt (degrees) |
|---|---|
| object | 61.1207 |
| image | −14.9984 |

Figure 4:
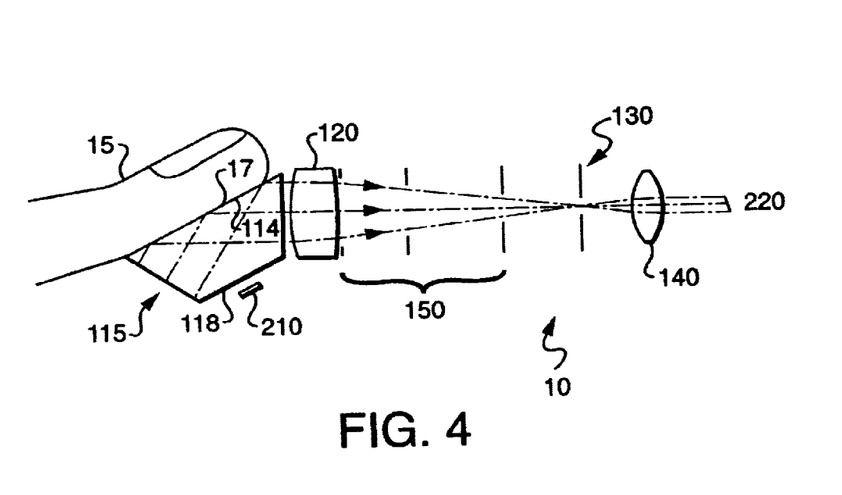
FIG. 4 is a schematic side elevation view of the fingerprint detection apparatus in FIG. 3 with a finger on the finger receiving surface.

FIG. 4 shows the emplacement of an object 15, such as a finger, on the finger receiving surface 113 of the platen 110. Object 15 is detected by means of an image sensor 220. The device includes a first lens 120, a second lens 140 and an aperture stop 130 between the first lens 120 and second lens 140. The light source 210, such as an LED, provides illumination which causes object 15 to appear as a white pattern upon the dark-field background.

Figure 5:
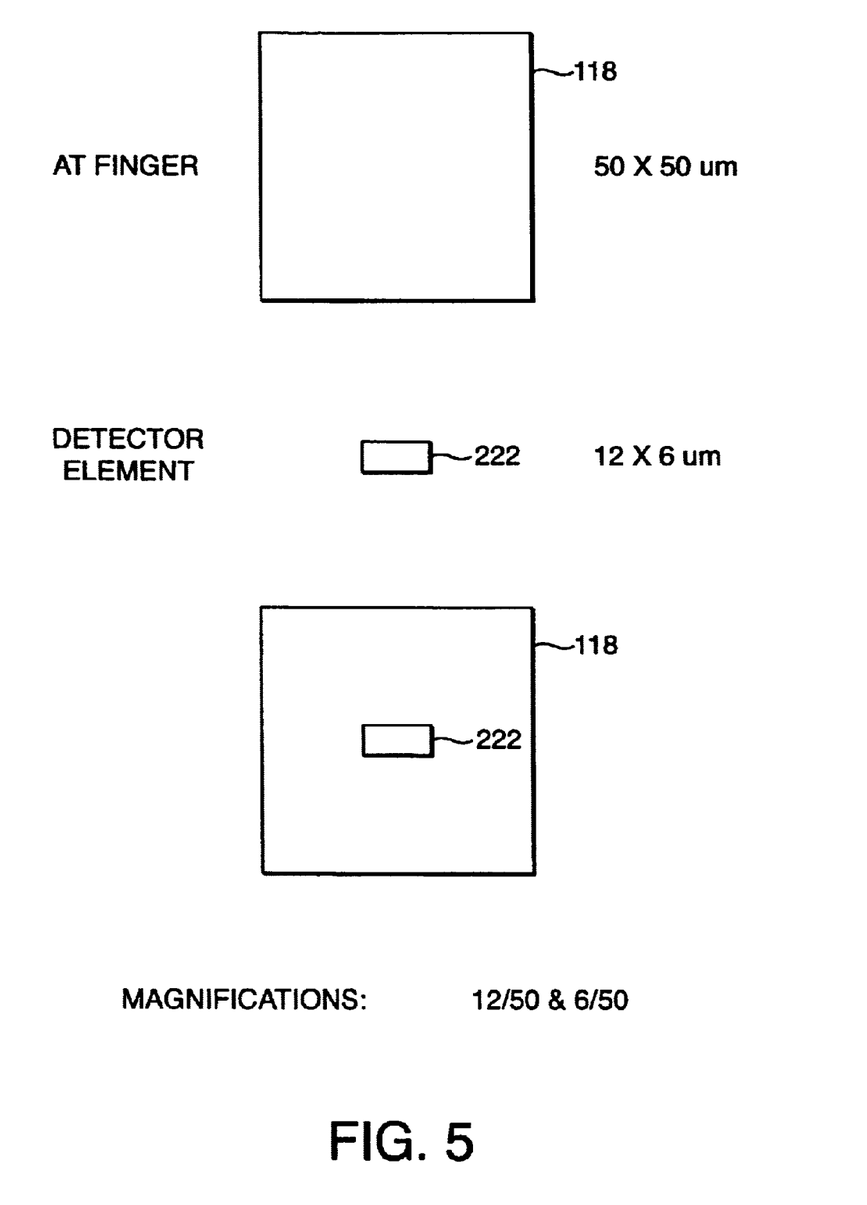
FIG. 5 is a diagram of the area at the finger receiving surface imaged onto the image sensor according to the present invention.

Now referring to FIG. 5, the optical components image a 50 μm×50 μm (0.002 inch$^2$) square area 118 on the finger receiving surface 113 onto 12×6 μm pixels rectangular pixels 222 of the image sensor 220. In an alternate embodiment, square pixels can be combined either with software processing or electronically without subsequent software processing to form an equivalent rectangular pixel imaging a rectangular area.

Figure 7:
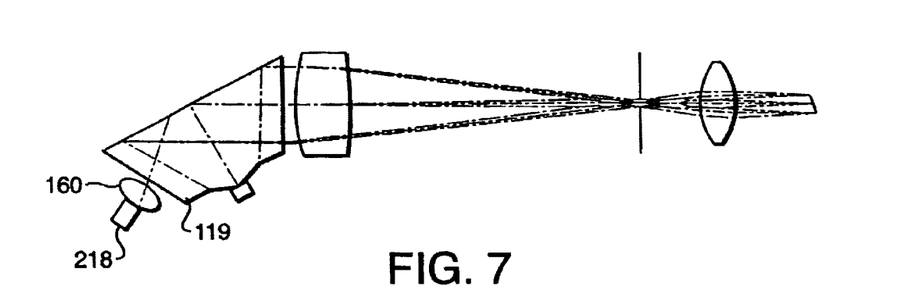
FIG. 7 is an oblique meridian view of an additional bright-field illumination source according to an alternate embodiment of the present invention.

FIG. 7 shows an alternate embodiment which includes an additional source of bright-field illumination 218 which is collimated by a collimating lens 160 with the resulting image appearing on the sensor 220 as a black pattern upon the bright-field background. In this embodiment, the illumination source can be rapidly switched between bright-field and dark-field in order to generate separate images. This allows the collection of additional data which can be processed by the software analysis software for enhanced recognition.

Figure 8:
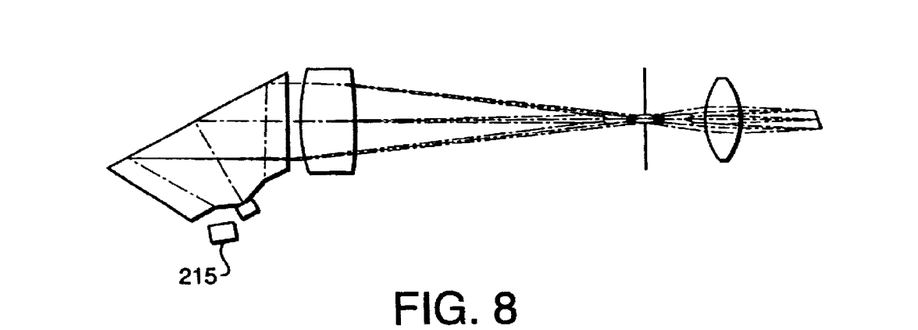
FIG. 8 is a diagram of the germicidal UV radiation according to an alternate embodiment of the present invention.

Now referring to FIG. 8, an alternate embodiment includes a source of germicidal UV radiation 215 is used to kill microbes on the finger receiving surface 113 of the platen 110.

Figure 9A:
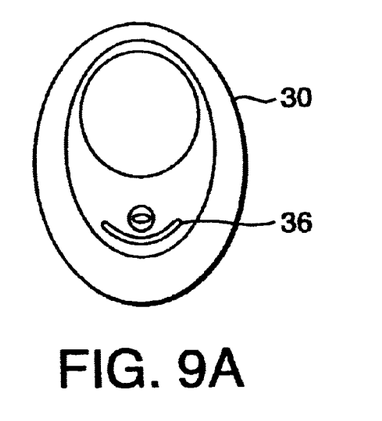
FIG. 9A is a schematic view of the adjustable bezel showing the a finger placement detent within the bezel 30 according to the present invention
Figure 9B:
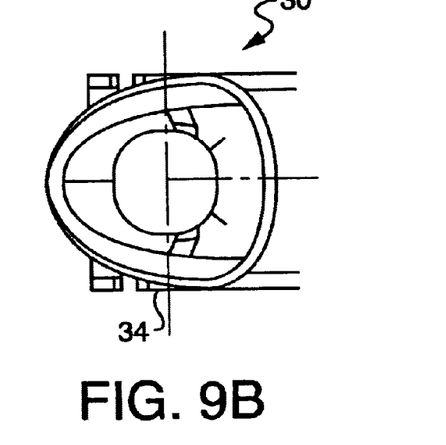
FIG. 9B is a schematic view of the adjustable bezel with mounting components according to the present invention
Figure 9C:
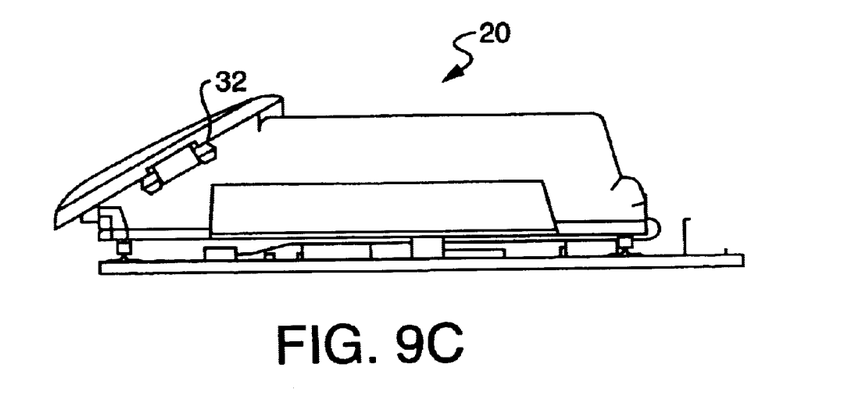
FIG. 9C is a schematic view of the adjustable bezel mounted on the housing of the fingerprint imaging apparatus according to the present invention.

FIG. 9C shows an adjustable bezel 30 mounted on housing 20. The bezel can be configured in several different orientations. In a preferred embodiment, the adjustable bezel 30 can be mounted by snapping it into place on the housing 20 using bezel 30 tabs 34, as shown in FIG. 9B, which mate with molded hosing 20 projections 32 to provide one of four orientations on the housing 20 to accommodate installing the fingerprint imaging apparatus 10 into a variety of other devices. The bezel 30 can optionally contain a detent 36, as shown in FIG. 9A, to aid in the placement of the user's finger within the bezel 30.

In an alternate embodiment, which does not image fingerprints, the combination of the first lens 120, aperture stop 130, and second lens 140, and the image sensor 220 mounted in the correct orientation can be used to image a square area 118 onto rectangular pixels 222 where the square area 118 and the sensor 220 are both at an oblique angle.

While there have been described preferred embodiments of the present invention, it will be readily apparent to those skilled in the art that various changes and modifications may be made therein without departing from the invention, and it is intended in the wording of the appended claims to include such changes and modifications as would be encompassed by the true spirit and scope of the invention. As will be appreciated by those skilled in the relevant art, the embodiments described are not meant to be interpreted in a limiting sense.

What is claimed is:

1. A biometric fingerprint imaging apparatus comprising:

a housing;

a platen having a finger receiving surface, mounted in said housing;

a light source mounted in said housing providing radiation which is reflected from said finger receiving surface along an optical axis;

an image sensor having a plurality of pixels, said image sensor disposed to receive radiation along said optical axis;

an optical subsystem which images a square area on said platen finger receiving surface onto a rectangular area on said image sensor to minimize anamorphic, non symmetric distortion, said optical subsystem comprising;

a first lens disposed between said finger receiving surface and said image sensor along said optical axis;

a second lens disposed between said first lens and said image sensor along said optical axis such that the first lens and second lens form an afocal optical combination; and an aperture stop disposed between said first lens and said second lens to block radiation which does not contribute to an image focused on said plurality of pixels;

said apparatus further including an independently controllable bright field light source and a third lens such that sequentially a dark field image and bright field image can be imaged on said sensor.

2. A biometric fingerprint imaging apparatus comprising:

a housing;

a platen having a finger receiving surface, mounted in said housing;

a light source mounted in said housing providing radiation which is reflected from said finger receiving surface along an optical axis;

an image sensor having a plurality of pixels, said image sensor disposed to receive radiation along said optical axis;

an optical subsystem which images a square area on said platen finger receiving surface onto a rectangular area on said image sensor to minimize anamorphic, non symmetric distortion said optical subsystem comprising;

a first lens disposed between said finger receiving surface and said image sensor along said optical axis;

a second lens disposed between said first lens and said image sensor along said optical axis such that the first lens and second lens form an afocal optical combination; and an aperture stop disposed between said first lens and said second lens to block radiation which does not contribute to an image focused on said plurality of pixels and wherein said aperture stop is disposed at a common internal focal point of said first lens and said second lens, such that the combination of said first lens and said second lens is doubly telecentric.

3. The fingerprint imaging apparatus of claim 2 wherein said combination of said first lens and said second lens is telecentric at both said finger receiving surface and said image sensor.

4. The fingerprint imaging apparatus of claim 2 wherein said aperture stop comprises a non-round aperture for passage of said radiation.

* * * * *